US006847769B1

United States Patent
Robinson et al.

(10) Patent No.: US 6,847,769 B1
(45) Date of Patent: Jan. 25, 2005

(54) OPTICAL FIBER AMPLIFIER

(75) Inventors: Alan Robinson, Harlow (GB); Jonathan King, Epping (GB); Stephen Wilson, Whittlesford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/739,529

(22) Filed: Dec. 15, 2000

(51) Int. Cl.$^7$ ................................................ G02B 6/16
(52) U.S. Cl. ..................... 385/123; 385/100; 385/24; 385/15; 385/141; 372/6; 359/343
(58) Field of Search ......................... 385/123, 24, 100, 385/15, 141; 372/6; 359/343

(56) References Cited

U.S. PATENT DOCUMENTS 4,838,643 A * 6/1989 Hodges et al. .............. 385/127
5,295,211 A * 3/1994 Weidman ...................... 372/6
5,742,722 A * 4/1998 Imoto ......................... 359/333
6,317,549 B1 * 11/2001 Brown ........................ 385/123

* cited by examiner

Primary Examiner—Toan Ton
Assistant Examiner—George Y. Wang
(74) Attorney, Agent, or Firm—Barnes & Thornburg

(57) ABSTRACT

An optical amplifier comprises a doped fiber core and a cladding layer surrounding the core. The mode field diameter of the fiber is greater than 8 $\mu$m and the refractive index difference between the core and the cladding layer is selected such that the cut-off wavelength at which the fiber becomes single mode lies in the range 1000–1550 nm. This amplifier uses a large made field diameter fiber, which reduces the intensity for a specified output power. This results in reduced filtering of the low frequency components of the signal. The refractive index difference between the core and cladding is selected such that the fiber is multi-mode at 980 nm, which enables bend performance to be improved.

9 Claims, 2 Drawing Sheets

OPTICAL FIBER AMPLIFIER

FIELD OF THE INVENTION

The present invention relates to optical fiber telecommunication systems and to optical fiber amplifiers which are employed in such systems.

BACKGROUND OF THE INVENTION

Fiber amplifiers provide gain by the stimulated emission of radiation. A fiber amplifier typically includes a gain fiber, the core of which includes active dopant ions. A signal to be amplified as well as a pump signal are provided to the fiber core, and a wavelength division multiplexer (WDM) coupler can be used for this purpose. The pump signal is typically generated by a laser diode.

The amplifier gain is related to the amount of pump power coupled to the gain fiber. Also, the output power of the amplifier influences the frequency response of the amplifier to signal modulation. In particular, as the output power increases, the amplifier becomes less effective for low frequency components of the input signal. The amplifier has a high pass frequency response, which shifts towards higher frequencies for increased output power. The low frequency response is dependent on the time constant of the amplifier, which is influenced by the intrinsic time constant of the erbium doped fiber (approximately 10 ms), the effective area of the fiber and the power levels.

There are, however, increasing power demands on optical amplifiers for use in WDM (wavelength division multiplex) optical communications systems. In these systems, a number of optical channels are located in close proximity across an operating bandwidth of the system, for example covering wavelengths of 1530 to 1610 nm. As the number of channels increases, the total output power requirements of the amplifier increase, and it is more difficult to keep cross talk between channels to acceptable levels.

Good overlap between the pump and signal field distributions and the erbium doping in the core is desirable. This can be accomplished by providing the gain fiber with a relatively small mode field diameter (MFD), a characteristic that causes the optical power to be concentrated in a relatively small area along the fiber axis. This increases the field intensity for fixed output powers and improves performance, particularly at low pump powers. A "high gain" or "high efficiency" fiber can be achieved by employing a relatively large refractive index difference between the core and cladding and a relatively small core diameter. Typically, the MFD for high efficiency fibers is less than the MFD of standard telecommunication fibers, by a factor of at least 1.5:1. Conventional telecommunication fibers typically have mode field diameters in the range of 9 $\mu$m to 11 $\mu$m for light at 1550 nm.

Amplifier fibers are typically designed to ensure single mode operation of the fiber at the signal and pump wavelengths. Typically, the pump signals have a wavelength of 980 nm and/or in the range 1450–1500 nm, and the fiber is therefore designed to have a single mode cut-off wavelength below 980 nm, so that for all wavelengths at or above 980 nm, the fiber operates as a single mode waveguide. Low bending losses are desired at the longest signal wavelength, and the requirement for single mode operation below 980 nm (for example at 97 (nm) and good bend performance at long wavelengths forces the use of small mode field diameter fiber with a relatively large refractive index difference. The bend performance of the fiber is improved by increasing the index difference between the core and cladding, while reducing the core diameter to maintain the cut-off wavelength at the required value.

One problem with the use of an amplifier using this conventional type of doped fiber, which occurs particularly at high operating powers, is the corruption of low frequency signals. This is aggravated by the low mode field diameter of conventional amplifier fiber, which tends to increase the low frequency attenuation. Systems using optical signals in the SONET or SDH format have relatively low frequency components. Some implementations of optical communications systems also use a low frequency analogue maintenance channel. This is a low modulation depth amplitude modulated signal which is superimposed over the signal data. This maintenance channel has a low data rate than the signal and can therefore be read using low speed electro-optic circuitry. However, the low data rate of this maintenance channel makes it vulnerable to the poor low frequency response of conventional amplifiers at high operating powers.

SUMMARY OF THE INVENTION

According to the invention, there is provided an optical amplifier comprising a doped fiber core and a cladding layer surrounding the core, the mode field diameter of the fiber being greater than 8 $\mu$m and the refractive index difference between the core and the cladding layer being selected such that the cut-off wavelength at which the fiber becomes single mode lies in the range 1000–1550 nm.

The amplifier of the invention uses a large mode field diameter fiber, which reduces the intensity for a specified output power. This results in reduced filtering of the low frequency components of the signal. The large mode field diameter worsens the bend performance of the fiber. Instead of reducing the refractive index difference to a level where the fiber is single mode at 980 nm, the refractive index difference is instead selected to provide single mode operation at the signal wavelength. In particular, the refractive index difference between the core and cladding is selected such that the fiber is multi-mode at 980 nm.

The pump source (or sources) is/are preferably in the wavelength range 1450–1500 nm in order for the fiber to provide single mode operation at the pump and signal wavelengths, although single mode operation at the pump wavelength is not essential. The operation of the amplifier is therefore closer to the cut-off wavelength, which reduces the population inversion at the edge of the core. Low intensity at the core-cladding boundary can be addressed by confining the rare earth (erbium) to the center of the core. For high power applications, the impact of this edge effect is small.

Preferably, the cut-off wavelength lies between 1000 and 1450 nm and the mode field diameter is between 10 and 14 $\mu$m. The amplifier is preferably for use with a pump operating at a wavelength between 1300 and 1450 nm.

The invention also provides a multi-stage amplifier with different fiber types, the large mode field diameter fiber of the invention being at the high power output end of the amplifier. Thus, the amplifier may comprise multiple fiber sections, a first fiber section being positioned at the input of the amplifier, and a second section being positioned at the output of the amplifier, wherein the second fiber section comprises a doped fiber core and a cladding layer surrounding the core, the mode field diameter of the fiber being greater than 8 $\mu$m, and the magnitude of the radial variation of refractive index difference between the core and the cladding layer being selected such that the cut-off wavelength at which the fiber becomes single mode lies in the range 1000–1550 nm, and wherein the first fiber section has a lower mode field diameter than the second fiber section.

The amplifier of the invention is preferably used in an optical transmission system having a transmitting node, a receiving node and an optical fiber link between the nodes, wherein the link includes one or more amplifying repeaters, each comprising an amplifier of the invention.

BRIEF DESCRIPTION OF THE DRAWINGS

Examples of the invention will now be described in detail with reference to the accompanying drawings in which.

DETAILED DESCRIPTION

Figure 1:
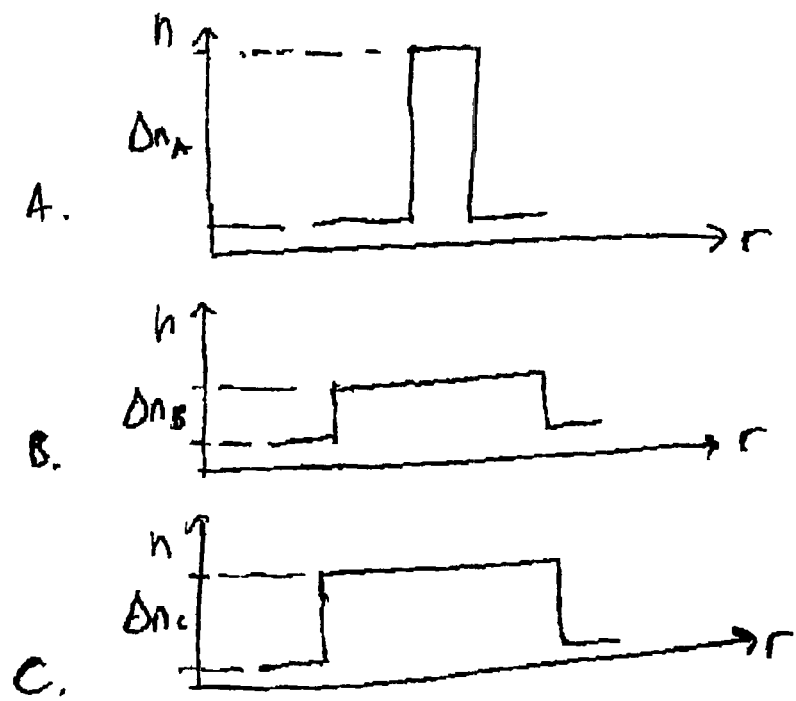
FIG. 1 is a schematic illustration of the refractive index profile in conventional amplification fiber and in amplification fiber of the invention.

FIG. 1 shows schematically the refractive index profiles for various types of fiber. FIG. 1A shows the profile for conventional amplification fiber, in which a relatively narrow core is used, giving a mode field diameter of around 4 to 6 $\mu$m at 1550 nm. This gives low noise and high efficiency operation and also ensures single mode operation for the pump and signal wavelengths of interest. The small mode field diameter results in higher intensity signals which improve the efficiency of the amplifier. The fiber has a relatively high refractive index difference between the core and cladding.

An optical amplifier essentially has a high-pass filtering response, and one problem with the conventional fiber design used in optical amplifiers is that the small mode field diameter results in significant low frequency signal attenuation at high power levels, which can adversely affect low frequency signal components or low frequency channels, such as analogue maintenance channels.

One possible solution to this problem is to reduce the signal intensity in the fiber, by increasing the mode field diameter. Thus, a profile as shown in FIG. 1B may be achieved. The larger core diameter gives rise to increased mode field diameter. However, in order to maintain single mode operation at the wavelengths of interest, the refractive index difference must be reduced, as shown schematically. Single mode operation will typically be desired above wavelengths of 980 nm, as 980 nm pump sources are frequently used.

The use of this fiber gives rise to poor bend performance, as a result of the low refractive index difference.

Figure 2:
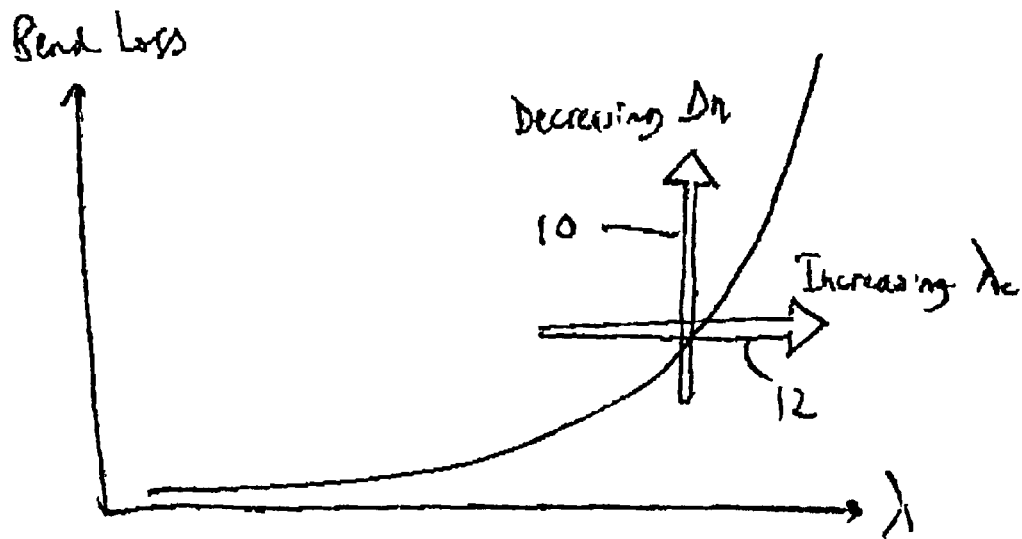
FIG. 2 shows how bend losses are influenced by the fiber design parameters.

FIG. 2 shows how bend losses are influenced by the fiber design parameters. As shown by arrow 10, a reduction in the refractive index difference, which is required to maintain single mode operation, worsens bend performance. However, increasing the single mode cut-off wavelength $\lambda_c$ tends to improve the bend performance as represented by arrow 12.

The invention provides an amplifier with a fiber having increased mode field diameter, in order to reduce low frequency attenuation, and with increased single mode cut off wavelength, to improve bend performance and the mode confinement. This increased single mode cut-off wavelength results from the increased refractive index difference, as shown in FIG. 1C, when compared with the profile of FIG. 1B which maintains single mode operation to lower wavelengths.

In particular, the mode field diameter of the fiber is greater than 8 $\mu$m and the refractive index difference between the core and the cladding layer is selected such that the cut-off wavelength at which the fiber becomes single mode lies in the range 1000–1450 nm. Use of a cut-off wavelength between 1000 nm and 1450 nm avoids mode coupling problems, and ensures an acceptable field uniformity across the core.

As one preferred example, the mode field diameter lies in the range 10 to 14 $\mu$m and the single mode cut off wavelength lies in the range 1300–1450 nm. This means the fiber is no longer single mode for the 980 nm pump wavelength, which may complicate the use of 980 nm pump sources. Instead, 1480 nm pump sources may be used. Single mode 1480 nm pump diodes are available with comparable or higher output powers than equivalent 980 nm devices.

The increased single mode cut-off wavelength means the amplifier will operate nearer to the cut off wavelength, which reduces population inversion at the edge of the rare earth doped core. The invention provides an amplifier design for high power operation (for example as a result of the total number of WDM channels), and at high power operation, for example 100 mW (+20 dBm) this effect becomes negligible. The reduced intensity gives rise to a longer time constant which thereby reduces the attenuation or distortion of low frequency components.

Figure 3:
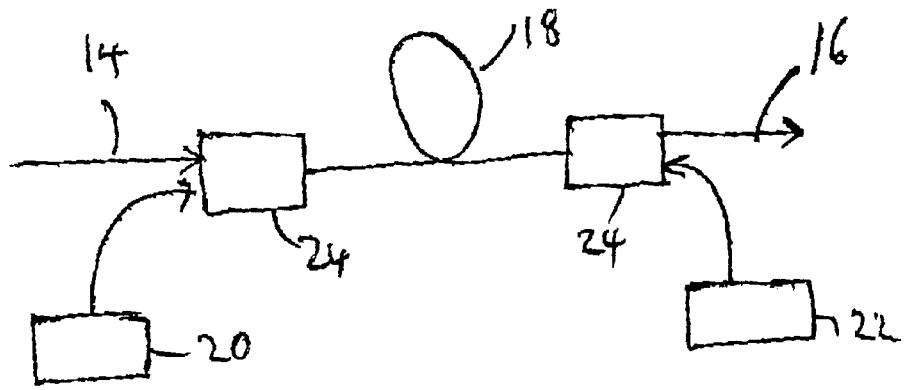
FIG. 3 shows a first fiber amplifier according to the invention.

FIG. 3 shows a first fiber amplifier according to the invention. An input signal is provided by input fiber 14 and an output is provided on output fiber 16. The rare earth doped fiber amplifier is represented as 18. In the example shown, the fiber amplifier is co- and counter-pumped by pump sources 20,22, which operate in the wavelength band 1450–1550 nm. The pump light is coupled with the signal on the main signal carrying fiber using WDM couplers 24.

Figure 4:
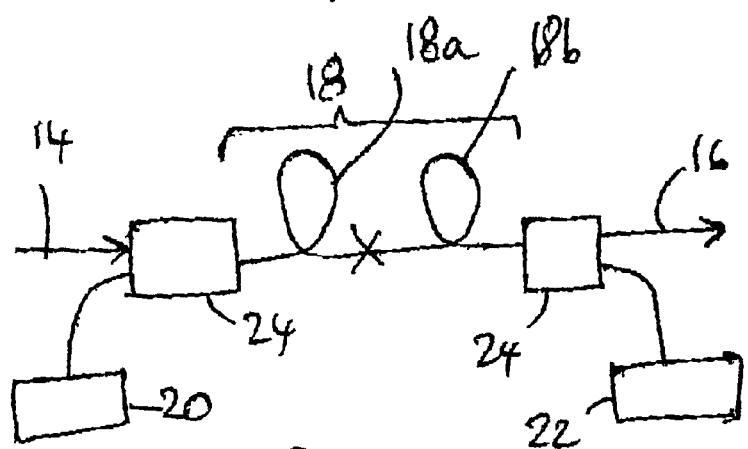
FIG. 4 shows a second fiber amplifier according to the invention.

FIG. 4 shows a second fiber amplifier according to the invention. Where the same components are used as in FIG. 3, the same reference numbers are used, and the description is not repeated. The rare earth doped fiber amplifier 18 comprises first and second fiber sections 18a, 18b, the first fiber section 18a being positioned at the input of the amplifier, and the second section 18b being positioned at the output of the amplifier. FIG. 4 shows the two fiber sections coupled directly together, although there would typically be additional components, such as an isolator, gain flattening filter, pump multiplexer inserted between. The second fiber section 18b is designed with the increased mode field diameter and increased cut-off wavelength, whereas the first fiber section 18a has a lower mode field diameter than the second fiber section. The first fiber section 18a may comprise conventional low effective area amplifier fiber. This design places the new fiber design at the high power end of the amplifier because, as described above, high power operation is required to ensure that the large effective area fiber undergoes sufficient population inversion.

Figure 5:
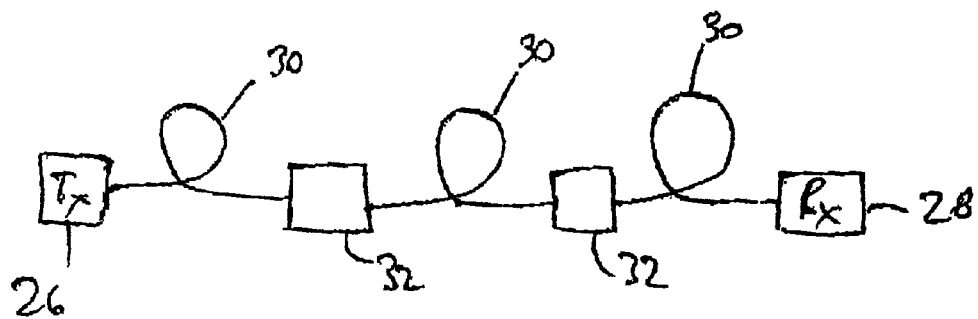
FIG. 5 shows an optical communications system using the amplifier of the invention.

FIG. 5 shows the amplifier of FIG. 3 or 4 used in an optical transmission system. The system comprises a transmitting node 26, a receiving node 28 and an optical fiber link 30 between the nodes. The link 30 includes one or more amplifying repeaters 32, each comprising an amplifier as described above.

The fiber used in the amplifier of the invention may comprise rare earth doped conventional transmission fiber. The fiber may comprise an annular core, in which the rare earth doping is confined to a relatively high field region in the center of the fiber.

The increased fiber core diameter will improve splice losses associated with the connection of the amplifier into communications systems. In particular, the fiber used in the amplifier may have the same core and cladding dimensions as the conventional transmission fiber used in the remainder of the system.

A more detailed example of a specific fiber configuration suitable for use in the amplifier of the invention will now be given, with reference to an example of the specific characteristics required of the amplifier.

It has been shown in C. R. Giles and E. Desurvire, "Modelling erbium-doped fiber amplifiers", J. Lightwave Technology, vol. 9, no. 2, February 1991, that a short section of the gain medium responds as a single-pole low-pass filter with a corner frequency of:

$$f_c = \frac{1 + \sum_k \frac{\overline{P}_k}{P_k^{mI}}}{2\pi\tau}$$

where $\overline{P}_k$ is the time-averaged power in each channel k, $P_k^{Ml}$ is the fiber saturation power at the wavelength of the channel k and τ is the excited state lifetime. This is an approximation which does not take account of the variation in power within a fiber amplifier.

Increasing the mode field diameter increases the fiber saturation power. Indeed, doubling the mode field diameter increases the fiber saturation power by a factor of 4, which reduces the corner frequency significantly. This in turn reduces the transmission loss at the channel frequency, which is important in long reach systems where both pre- and post-amplifiers are present and with many line amplifiers used in each link.

Typical parameters for step index profiles fibers with aluminosilicate or germania-aluminosilicate core are given below:

Conventional fiber (as schematically shown in FIG. 1A)

| | |
|---|---|
| Mode field diameter at 1550 nm: | 5.5 μm |
| Theoretical fiber cut-off wavelength: | 920 nm |
| Core-cladding refractive index difference: | 0.021 |
| Core radius: | 1.42 μm |

Large area fiber for use in the amplifier of the invention (as schematically shown in FIG. 1C)

| | |
|---|---|
| Mode field diameter at 1550 nm: | 11 μm |
| Theoretical fiber cut-off wavelength: | 1550 nm |
| Core-cladding refractive index difference: | 0.004 |
| Core radius: | 5.5 μm |

The erbium concentration may be adjusted so that the absorption at 1530 nm is in the range 2 dB/m to 25 dB/m. The erbium concentration is not usually critical, and will be selected as a compromise between increased background attenuation for long fiber lengths, against a possible loss of efficiency, for example due to excited state absorption from erbium ion clustering, at very high concentrations. By way of example, the corner frequency may be designed to be around 5 kHz for a modulation frequency of 100 kHz.

Although not described or shown above, various components may additionally be used within the amplifier to reduce backward propagating ASE, for example buried isolators and filters. There are numerous pumping schemes which may include intermediate coupling of pump light into the amplifier at a location between the ends of the fiber. All of these possibilities can be employed in the amplifier of the invention, and will be apparent to those skilled in the art.

We claim:

1. An optical amplifier comprising a gain fiber having a doped fiber core and a cladding layer surrounding the core, the mode field diameter of the gain fiber being greater than 10 μm and the refractive index difference between the core and the cladding layer being selected such that the cut-off wavelength at which the gain fiber becomes single mode lies in the range 1000–1550 nm.

2. An optical amplifier according to claim 1, wherein the cut-off wavelength lies between 1300 and 1450 nm.

3. An optical amplifier according to claim 1, wherein the mode field diameter is between 10 and 14 μm.

4. An optical amplifier comprising multiple gain fiber sections, a first gain fiber section being positioned at the input of the amplifier, and a second gain fiber section being positioned at the output of the amplifier, wherein the second gain fiber section comprises a doped fiber core and a cladding layer surrounding the core, the mode field diameter of the fiber being greater than 10 μm, and the magnitude of the radial variation of refractive index difference between the core and the cladding layer being selected such that the cut-off wavelength at which the fiber becomes single mode lies in the range 1000–1550 nm, and wherein the first gain fiber section has a lower mode field diameter than the second gain fiber section.

5. An optical amplifier according to claim 4, wherein the cut-off wavelength of the second fiber section lies between 1300 and 1550 nm.

6. An optical amplifier according to claim 4, wherein the mode field diameter of the second fiber section is between 10 and 14 μm.

7. An optical transmission system comprising a transmitting node, a receiving node and an optical fiber link between the nodes, wherein the link includes one or more amplifying repeaters, each comprising an amplifier comprising a gain fiber having a doped fiber core and a cladding layer surrounding the core, the mode field diameter of the gain fiber being greater than 10 μm and the refractive index difference between the core and the cladding layer being selected such that the cut-off wavelength at which the gain fiber becomes single mode lies in the range 1000–1550 nm.

8. An optical transmission system comprising a transmitting node, a receiving node and an optical fiber link between the nodes, wherein the link includes one or more amplifying repeaters, each comprising an amplifier having two or more gain fiber sections, a first gain fiber section being positioned at the input of the amplifier, and a second gain fiber section being positioned at the output of the amplifier, wherein the second gain fiber section comprises a doped fiber core and a cladding layer surrounding the core, the mode field diameter of the fiber being greater than 10 μm and the refractive index difference between the core and the cladding layer being selected such that the cut-off wavelength at which the fiber becomes single mode lies in the range 1000–1550 nm, and wherein the first gain fiber section has a lower mode field diameter than the second gain fiber section.

9. A method of designing an optical gain fiber comprising a core and cladding, for use in an optical amplifier, comprising the steps of:

selecting a core diameter such that the mode field diameter of the gain fiber is greater than 10 $\mu$m and such that low frequency attenuation is below desired limits;

selecting a refractive index difference between the core and the cladding layer such that the cut-off wavelength at which the gain fiber becomes single mode lies in the range 1000–1550 nm and such that bending losses are below desired limits.

* * * * *